(12) United States Patent
Singh

(10) Patent No.: US 10,797,384 B2
(45) Date of Patent: Oct. 6, 2020

(54) RADAR SUPPORT STRUCTURE

(71) Applicant: Nissan North America, Inc., Franklin, TN (US)

(72) Inventor: Jasvir Singh, Novi, MI (US)

(73) Assignee: Nissan North America, Inc., Franklin, TN (US)

(*) Notice: Subject to any disclaimer, the term of this patent is extended or adjusted under 35 U.S.C. 154(b) by 284 days.

(21) Appl. No.: 15/852,104

(22) Filed: Dec. 22, 2017

(65) Prior Publication Data

US 2019/0198986 A1    Jun. 27, 2019

(51) Int. Cl.
| | |
|---|---|
| *H01Q 1/32* | (2006.01) |
| *B60R 19/48* | (2006.01) |
| *H01Q 1/18* | (2006.01) |
| *G01S 13/931* | (2020.01) |
| *B60R 13/00* | (2006.01) |

(52) U.S. Cl.
CPC ......... *H01Q 1/3233* (2013.01); *B60R 19/483* (2013.01); *H01Q 1/18* (2013.01); *H01Q 1/3283* (2013.01); *B60R 13/005* (2013.01); *G01S 13/931* (2013.01); *G01S 2013/93275* (2020.01)

(58) Field of Classification Search
CPC ................... H01Q 1/32; H01Q 1/18
USPC .......................................... 343/713
See application file for complete search history.

(56) References Cited

U.S. PATENT DOCUMENTS

| | | | |
|---|---|---|---|
| 2014/0111370 A1* | 4/2014 | Aleem ................. | B60R 19/483 342/70 |
| 2016/0137230 A1* | 5/2016 | Taneda ................. | B62D 25/085 296/193.09 |
| 2016/0231417 A1* | 8/2016 | Aoki ..................... | G01S 13/931 |
| 2017/0222311 A1 | 8/2017 | Hess et al. | |

* cited by examiner

*Primary Examiner* — Andrea Lindgren Baltzell
(74) *Attorney, Agent, or Firm* — Global IP Counselors, LLP

(57) ABSTRACT

A radar support structure includes a vehicle body structure, an emblem, a radar attachment assembly and a radar unit. The vehicle body structure has a front end, with the emblem being attached to the front end of the vehicle body structure. The radar attachment assembly has an attachment portion, a mounting portion and an energy absorbing portion. The energy absorbing portion is disposed between the attachment portion and the mounting portion. The attachment portion is fixedly attached to the front end of the vehicle body structure. The radar unit is installed to the mounting portion such that the radar unit is spaced apart from and aligned with the emblem.

20 Claims, 5 Drawing Sheets

RADAR SUPPORT STRUCTURE

BACKGROUND

Field of the Invention

The present invention generally relates to a vehicle radar support structure. More specifically, the present invention relates to vehicle radar support structure that includes an energy absorbing portion that absorbs forces associated with rapid changes in velocity.

Background Information

Radar units are installed in many vehicle structures. These radar units are typically attached to rigid brackets that are installed to rigid vehicle body structures.

SUMMARY

One object of the present disclosure is to provide a vehicle with a radar unit attachment assembly that includes an energy absorbing portion that absorbs energy associated with rapid changes in velocity and, in particular, changes in velocity associated with an impact event.

In view of the state of the known technology, one aspect of the present disclosure is to provide a radar support structure with a vehicle body structure, an emblem, a radar attachment assembly and a radar unit. The vehicle body structure has a front end, with the emblem being attached to the front end of the vehicle body structure. The radar attachment assembly has an attachment portion, a mounting portion and an energy absorbing portion. The energy absorbing portion is disposed between the attachment portion and the mounting portion. The attachment portion is fixedly attached to the front end of the vehicle body structure. The radar unit is installed to the mounting portion such that the radar unit is spaced apart from and aligned with the emblem.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
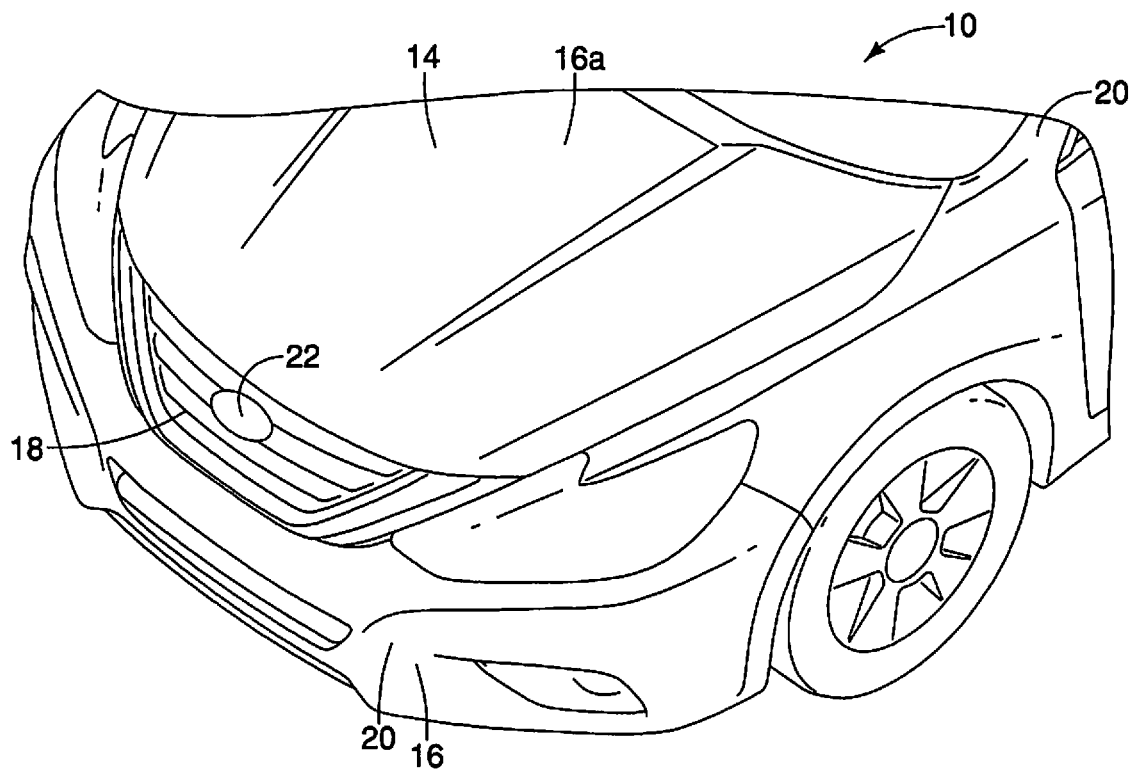
FIG. 1 is a perspective view of a front end of a vehicle that includes a radar support structure in accordance with an embodiment.

Referring initially to FIG. 1, a vehicle 10 that includes a radar attachment assembly 12 (FIGS. 3-9) is illustrated in accordance with a first embodiment.

Figure 2:
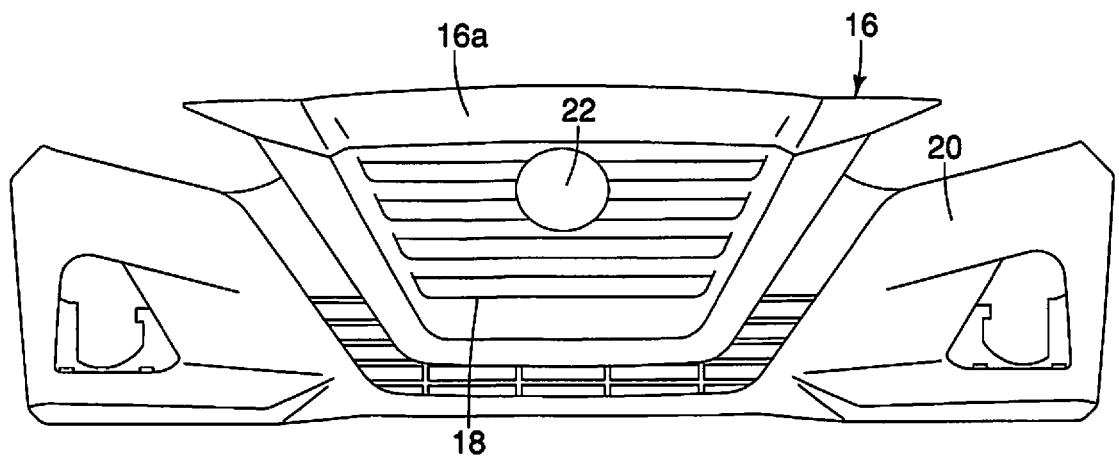
FIG. 2 is a front view of the front end of the vehicle showing an emblem attached thereto in accordance with the depicted embodiment.

The vehicle 10 has a vehicle body structure 14 with a front end 16. As shown in FIG. 2, the front end 16 includes a grill portion 18 and a bumper fascia 20. The bumper fascia 20 is attached to various portions of the vehicle body structure 14 in a conventional manner. As is described in greater detail below, an emblem 22 is installed to the grill portion 18. The emblem 22 is shown centered on the grill portion 18. The emblem 22 is made of a non-interfering material that allows radar signals to readily penetrate and pass therethrough. The emblem 22 can optionally include or define a vehicle manufacturer's logo.

Figure 3:
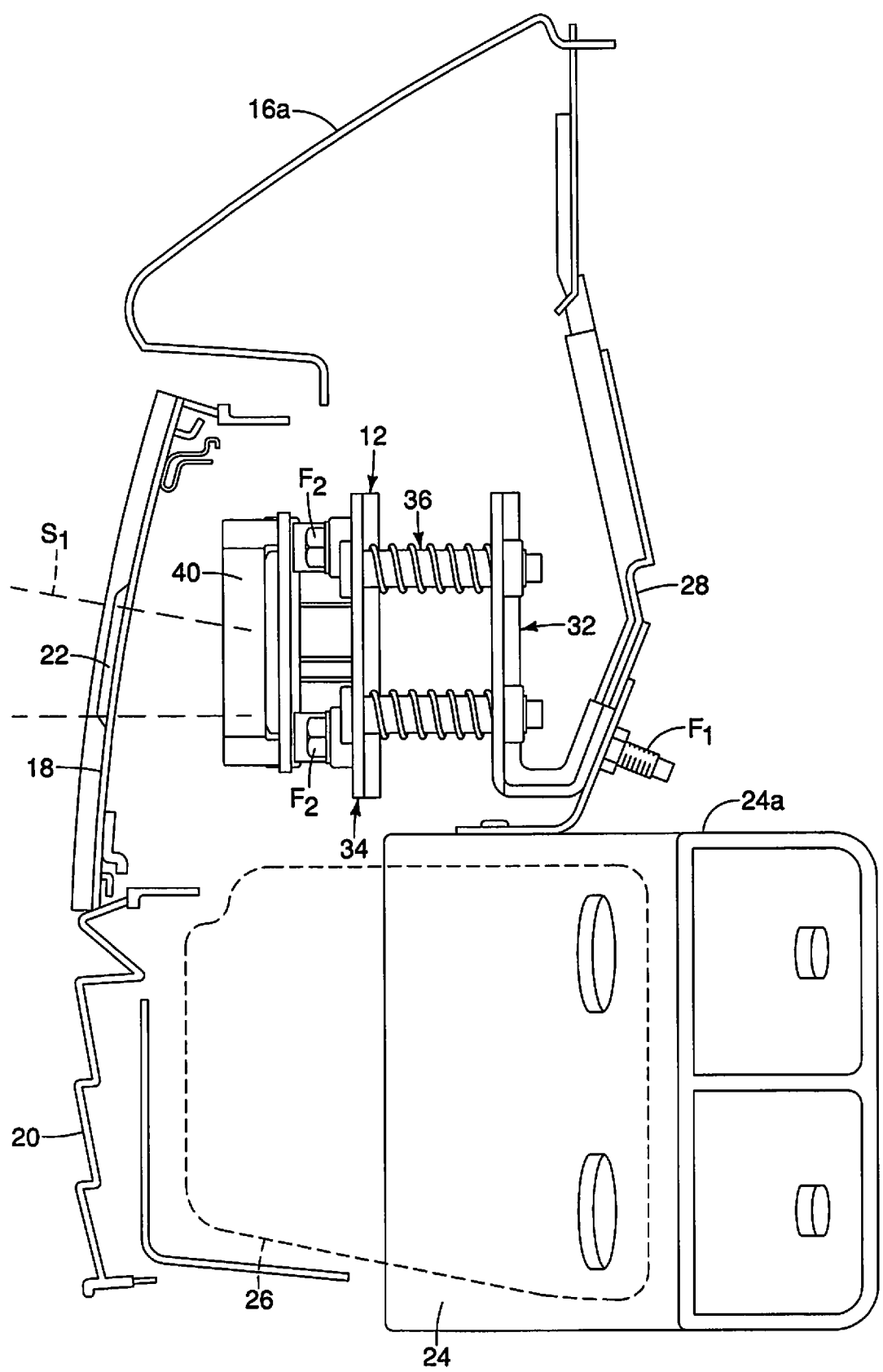
FIG. 3 is a cross-sectional view of the front end of the vehicle showing a bumper fascia, a bumper energy absorbing member, a bumper support bracket and a radar attachment assembly in accordance with the depicted embodiment.

As shown in FIG. 3, the vehicle body structure 14 also includes a front bumper assembly 23. The front bumper assembly 23 includes a bumper support bracket 24, a bumper energy absorbing member 26 and the bumper fascia 20. The bumper support bracket 24 is supported to the vehicle body structure 14 in a conventional manner. Specifically, the bumper support bracket 24 is bolted via fasteners (not shown) or welded to a front side member (not shown) of a frame structure (not shown) of the vehicle 10. The bumper energy absorbing member 26 is fixed to the bumper support bracket 24 in a conventional manner. As is also shown in FIG. 3, the bumper fascia 20 is further attached to an upper surface 24a of the bumper support bracket 24 via a support bracket 28 (an upright support bracket 28). In the depicted embodiment, the upper surface 24a is a horizontal surface. However, the configuration and orientation of the upper surface 24a is not limited to a horizontal surface, but can alternatively be inclined in either a forward or rearward direction.

A lower end of the support bracket 28 can be bolted via fasteners to the bumper support bracket 24 and an upper end fixed to the bumper fascia 20 via a snap-fitting connection, mechanical fasteners, or other connection structure that retains the bumper fascia 20 and hood latch mechanism (not shown) in position relative to the front end 16 of the vehicle 10. The hood latch mechanism (not shown) retains a conventional engine hood 16a in a closed orientation. Since vehicle body structures, bumper fascia, bumper support brackets and bumper energy absorbing members are conventional vehicle elements, further description is omitted for the sake of brevity.

A description of the radar attachment assembly 12 is now provided with specific reference to FIGS. 3-9. The radar attachment assembly 12 basically includes an attachment portion 32, a mounting portion 34 and an energy absorbing portion 36 disposed between the attachment portion 32 and the mounting portion 34. The attachment portion 32 is fixedly attached to the front end 16 of the vehicle body structure 14 via connection to the support bracket 28 by fasteners $F_1$.

A radar unit 40 is installed to the mounting portion 34 such that the radar unit 40 is spaced apart from and aligned with the emblem 22. Via the shape and dimensions of the radar attachment assembly 12, the radar unit 40 is positioned and aligned with the emblem 22 such that radar signals Si from the radar unit 40 pass through the emblem 22 and radar signals reflected from nearby objects back to the front end 16 of the vehicle body structure 14 pass through the emblem 22 where they are received by the radar unit 40.

The radar unit 40 is part of a radar system (not shown) of the vehicle 10 that includes, for example, an electronic controller (with micro-processor and memory) and a display (not shown) within a passenger compartment of the vehicle 10. The radar unit 40 detects proximity to other vehicles and obstacles forward of the vehicle 10. The electronic controller processes signals from the radar unit 40 and displays information for a vehicle operator's use. The display of the radar system can be replaced with, or can include an audio device that provides audio signals to the vehicle operator in response to detection of vehicles and/or objects ahead of the vehicle 10. Since radar systems are conventional vehicle components, further description is omitted for the sake of brevity.

Figure 6:
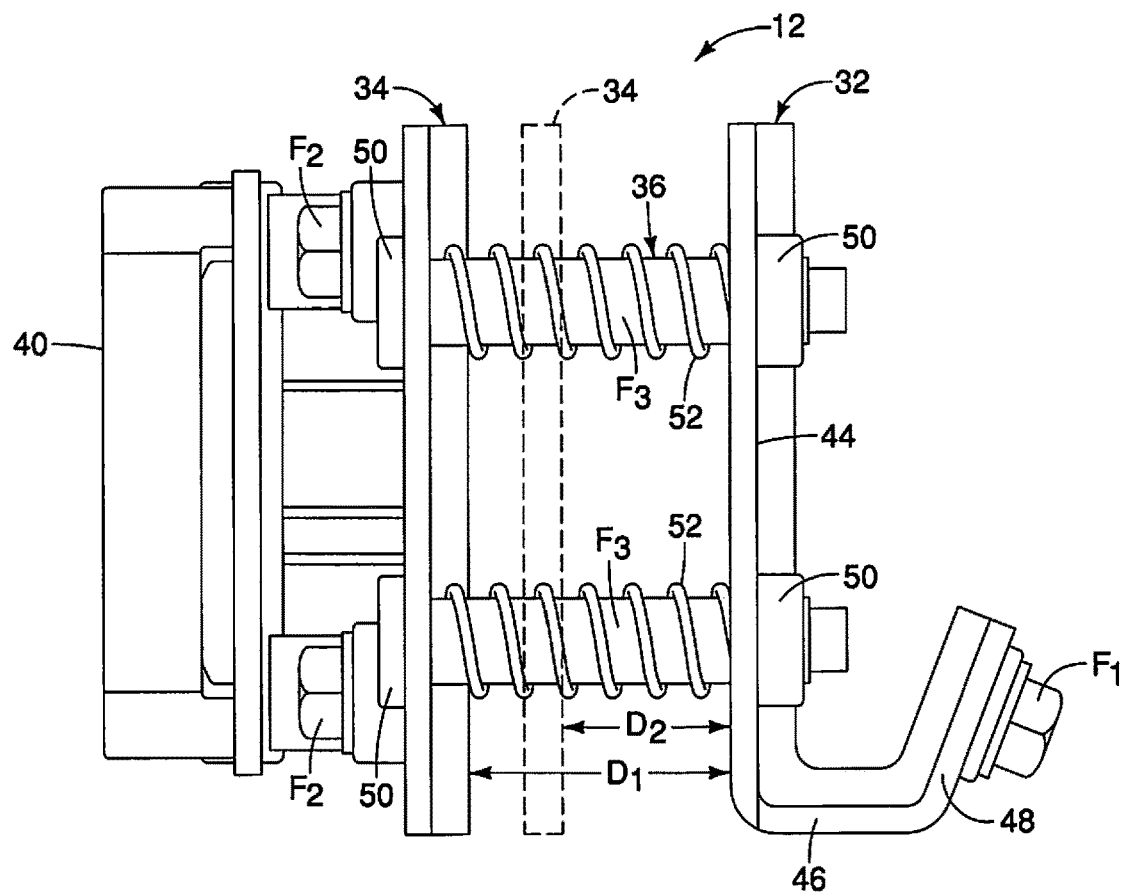
FIG. 6 is a side view of the radar attachment assembly shown removed from the vehicle in accordance the depicted embodiment.
Figure 7:
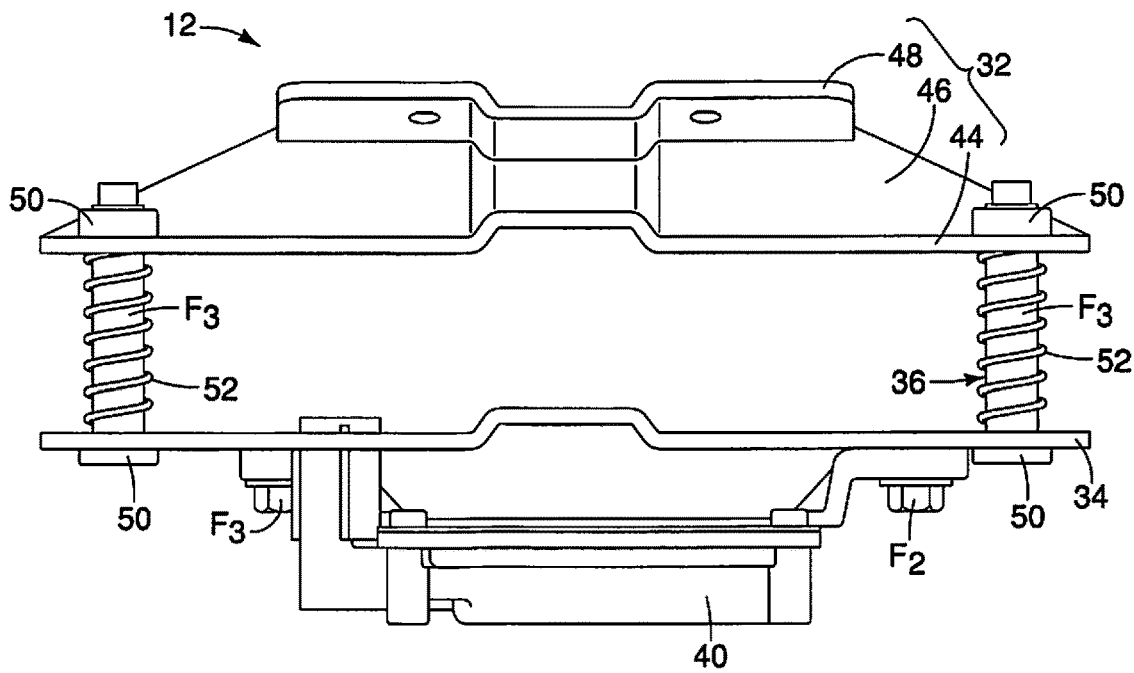
FIG. 7 is a top view of the radar attachment assembly shown removed from the vehicle in accordance the depicted embodiment.
Figure 8:
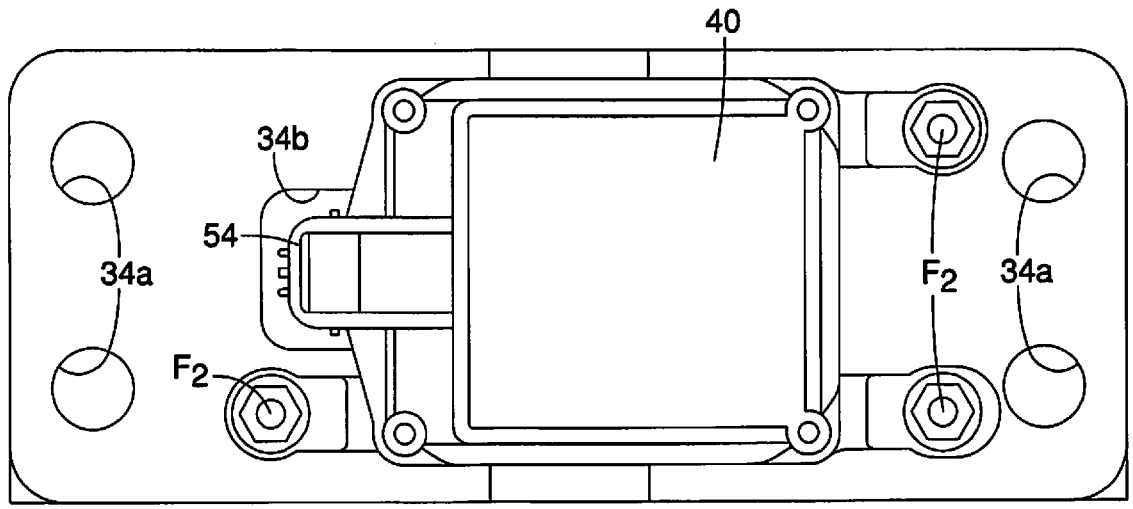
FIG. 8 is a front view of the radar attachment assembly shown removed from the vehicle in accordance the depicted embodiment.
Figure 9:
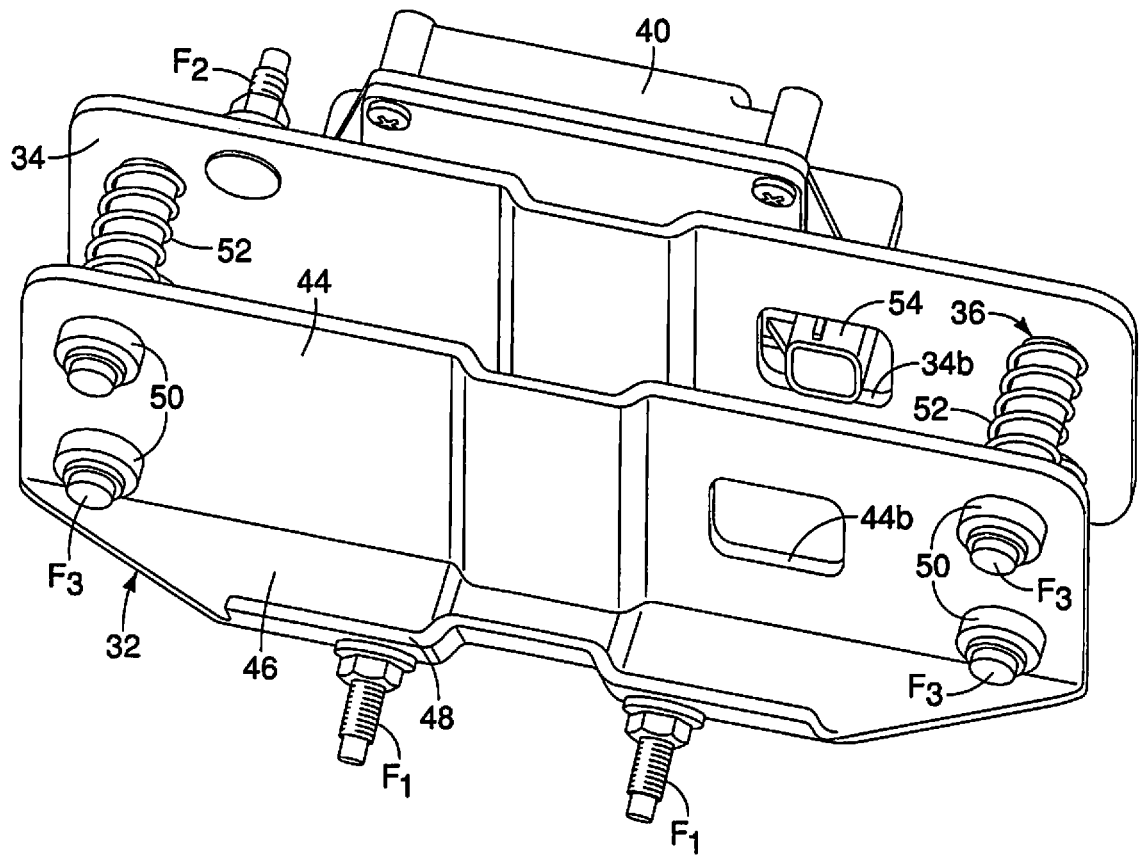
FIG. 9 is a rear perspective view of the radar attachment assembly shown removed from the vehicle in accordance the depicted embodiment.

As shown in FIGS. 6, 7 and 9, the attachment portion 32 includes main plate 44, an elongated section 46 and a plate section 48. The plate section 48 is fixed to the support bracket 28 via the fasteners $F_1$. Therefore, the plate section 48 (and the radar attachment assembly 12) is supported by the upper surface 24*a* of the support bracket 24 of the front bumper assembly 23. The elongated section 46 is curved. More specifically, the elongated section 46 is dimensioned and shaped to flex in response to impacting forces acting on a forward surface of the radar unit 40.

The mounting portion 34 is basically a flat plate that is shaped and configured for direct attachment of the radar unit 40 thereto. Specifically, the radar unit 10 is fixedly attached to the mounting portion 34 via fasteners $F_2$.

Figure 4:
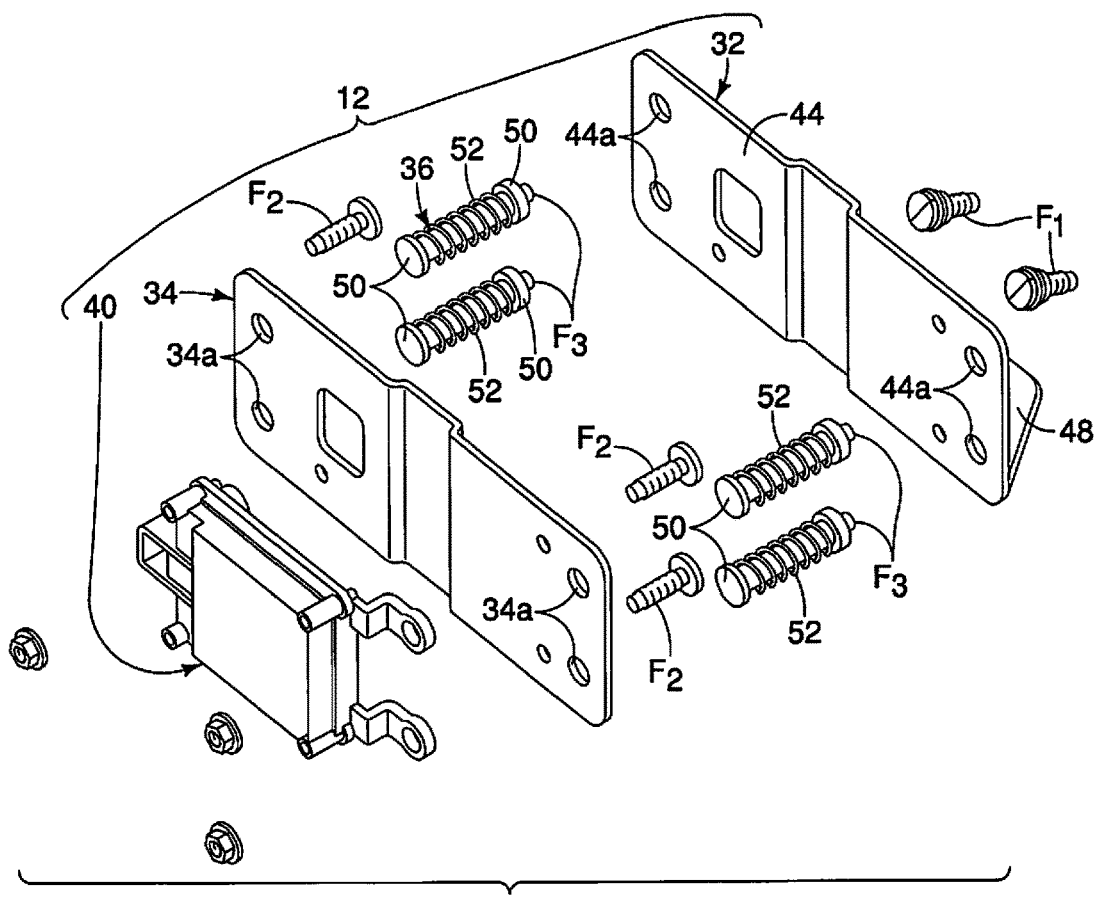
FIG. 4 is an exploded perspective view of the radar attachment assembly in accordance the depicted embodiment.
Figure 5:
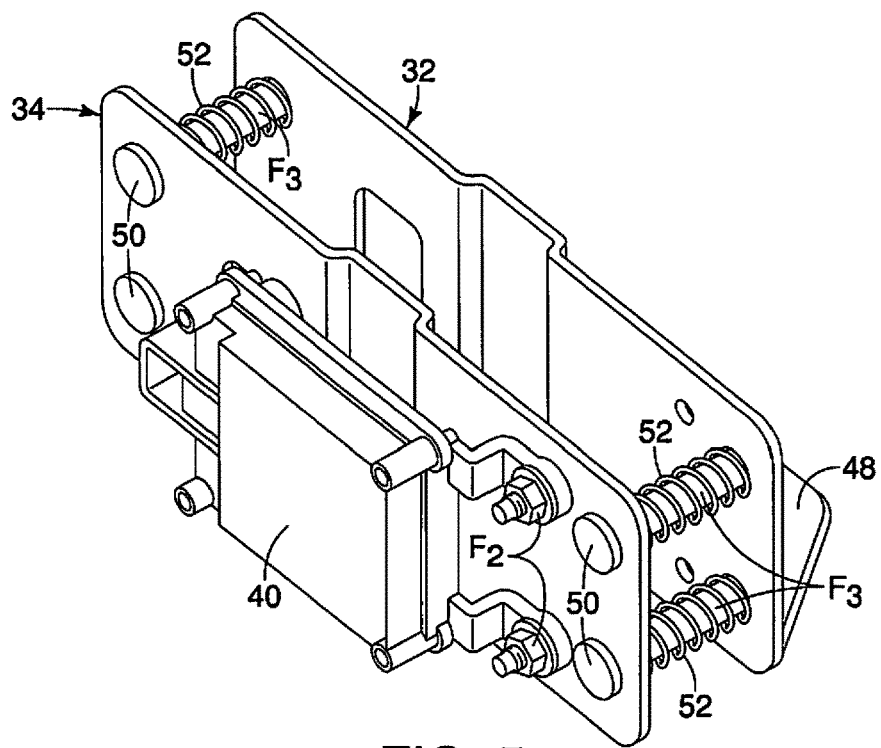
FIG. 5 is a perspective view of the radar attachment assembly shown removed from the vehicle in accordance the depicted embodiment.

The energy absorbing portion 36 of the radar attachment assembly 12 includes a plurality of fasteners $F_3$ that extend through respective openings 34*a* and 44*a* in the main plate 44 of the attachment portion 32 and in the mounting portion 34 (see FIG. 4). The fasteners $F_3$ are not fixed to either of the main plate 44 or the mounting portion 34. Rather, each end of each of the fasteners $F_3$ includes an end cap 50 that restricts movement of the fasteners $F_3$. Each of the fasteners $F_3$ also extends through corresponding a corresponding one of a plurality of spring members 52 (also referred to as biasing springs 52). The spring members 52 are confined between the main plate 44 and the mounting portion 34, and further prevented from moving laterally due to the presence of the fasteners $F_3$. In other words, the fasteners $F_3$ extend through the openings 34*a*, through the spring members 52 and then through the openings 44*a*. The end caps 50 are rigidly fixed to the fasteners $F_3$ and therefore prevent movement of the main plate 44 and the mounting portion 34 in directions away from one another, when the radar attachment assembly 12 is fully assembled and without impacting forces acting thereon.

In response to the front end 16 of the vehicle 10 absorbing and transmitting impacting forces rearward, the grill portion 18 and/or the bumper fascia 20 can move rearward and contact the radar unit 40. During such an impact event, the energy absorbing portion 36 of the radar attachment assembly 12 can absorb at least a portion of the impacting forces.

As shown in FIG. 6, in a non-impacted state, the mounting portion 34 and the main plate 44 of the attachment portion 32 are spaced apart from one another by a first distance $D_1$. During an impact event, the biasing springs 52 can be compressed, since the fasteners F3 are not rigidly connected to the mounting portion 34 and the main plate 44. Consequently, the biasing springs 52 are compressed absorbing impact forces as the mounting portion 34 and the main plate 44 move toward one another. At a maximum absorption of impact energy, the biasing springs 52 compress such that the main plate 44 and the mounting portion 34 are spaced apart from one another by a second distance $D_2$ that is smaller than the first distance $D_1$. During the impact event, impacting forces can be initially transmitted to the radar unit 40 via the grill portion 18 and/or the bumper fascia 20. However, since the biasing springs 52 are compressed, the amount of energy imparted or felt by the radar unit 40 is minimized. When installed to the vehicle 10 via the radar attachment assembly 12, the impacting forces actually absorbed by the radar unit 40 are minimized since the radar unit 40 transmits impacting forces to the biasing springs 52.

Further, the elongated section 46 is dimensioned and shaped to flex in response to impacting forces acting on a forward surface of the radar unit 40 further reducing the level of impacting forces experienced by the radar unit 40.

As shown in FIG. 9, the radar unit 40 includes an electrical plug 54 that is exposed via an opening 34*b* in the mounting portion 34. A connector and cable (not shown) can be inserted through an opening 44*b* in the attachment portion 32 and plugged into the electrical plug 54 of the radar unit 40, thereby connecting the radar unit 40 to the controller (not shown) and a display (not shown) to provide radar data to a vehicle operator.

The vehicle structures (other that the radar support structure) are conventional components that are well known in the art. Since vehicle structures are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the radar support structure. Accordingly, these terms, as utilized to describe the present invention should be interpreted relative to a vehicle equipped with the radar support structure.

The term "configured" as used herein to describe a component, section or part of a structure or structures that is/are constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A radar support structure, comprising:
   a vehicle body structure having a front end;
   an emblem attached to the front end of the vehicle body structure;
   a radar attachment assembly having an attachment portion, a mounting portion and an energy absorbing portion disposed between the attachment portion and the mounting portion, the attachment portion being fixedly attached to the front end of the vehicle body structure; and
   a radar unit installed to the mounting portion such that the radar unit is spaced apart from and aligned with the emblem.

2. The radar support structure according to claim 1, wherein
   the front end of the vehicle body structure includes a front bumper assembly having a support bracket, an energy absorbing member, a facia member and a grill portion attached to forward portions of a vehicle, the support bracket having a surface spaced apart from the energy absorbing member.

3. The radar support structure according to claim 2, wherein
   the surface of the support bracket is an upper surface thereof.

4. The radar support structure according to claim 3, wherein
   the upper surface of the support bracket is a horizontal surface that extends in a vehicle lateral direction.

5. The radar support structure according to claim 4, wherein
   the attachment portion of the radar attachment assembly is supported by the upper surface of the support bracket of the front bumper assembly.

6. The radar support structure according to claim 1, wherein
   the energy absorbing portion of the radar attachment assembly includes a plurality of fasteners that extend through respective openings is the attachment portion and the mounting portion with a corresponding plurality of spring members being retained between the attachment portion and the mounting portion by corresponding ones of the plurality of fasteners such that in response to impacting forces acting on a forward surface of the radar unit, the plurality of spring members are compressed absorbing at least a portion of the impacting forces.

7. The radar support structure according to claim 3, wherein
   the attachment portion of the radar attachment assembly includes an elongated section and a plate section such that the plate section is supported by the upper surface of the support bracket of the front bumper assembly, and the elongated section is dimensioned and shaped to flex in response to impacting forces acting on a forward surface of the radar unit.

8. The radar support structure according to claim 1, wherein
   the emblem is made of a non-interfering material configured to allow radar signals to pass therethrough.

9. The radar support structure according to claim 8, wherein
   the radar unit is positioned and aligned with the emblem such that radar signals from the radar unit pass through the emblem and radar signals reflected from nearby objects back to the front end of the vehicle body structure pass through the emblem to the radar unit.

10. The radar support structure according to claim 1, wherein
    the emblem includes a vehicle manufacturer's logo.

11. A radar support structure, comprising:
    a front bumper assembly having a support bracket, an energy absorbing member and a facia member and attached to forward portions of a vehicle, the support bracket having a surface spaced apart from the energy absorbing member;
    a radar attachment assembly having an attachment portion, a mounting portion and an energy absorbing portion disposed between the attachment portion and the mounting portion, the attachment portion being fixedly attached to the surface of the support bracket of the front bumper assembly; and
    a radar unit installed to the mounting portion.

12. The radar support structure according to claim 11, wherein
    the surface of the support bracket is an upper surface thereof.

13. The radar support structure according to claim 12, wherein
    the upper surface of the support bracket is a horizontal surface that extends in a vehicle lateral direction.

14. The radar support structure according to claim 13, wherein
    the attachment portion of the radar attachment assembly is supported by the upper surface of the support bracket of the front bumper assembly.

15. The radar support structure according to claim 11, wherein
    the energy absorbing portion of the radar attachment assembly includes a plurality of fasteners that extend through respective openings is the attachment portion and the mounting portion with a corresponding plurality of spring members being retained between the attachment portion and the mounting portion by corresponding ones of the plurality of fasteners such that in response to impacting forces acting on a forward surface of the radar unit, the plurality of spring members are compressed absorbing at least a portion of the impacting forces.

16. The radar support structure according to claim 11, wherein the attachment portion of the radar attachment assembly includes an elongated section and a plate section such that the plate section is installed to the upper surface of the support bracket of the front bumper assembly, and the elongated section is dimensioned and shaped to flex in response to impacting forces acting on a forward surface of the radar unit.

17. The radar support structure according to claim 11, wherein the front bumper assembly further includes a grill portion attached to the facia member, and an emblem attached to the grill.

18. The radar support structure according to claim 17, wherein the emblem is made of a non-interfering material configured to allow radar signals to pass therethrough.

19. The radar support structure according to claim 18, wherein the radar unit is positioned and aligned with the emblem such that radar signals from the radar unit pass through the emblem and radar signals reflected from nearby objects back to the front end of the vehicle body structure pass through the emblem to the radar unit.

20. The radar support structure according to claim 18, wherein the emblem includes a vehicle manufacturer's logo.

* * * * *